United States Patent
Huber et al.

(10) Patent No.: US 10,954,850 B2
(45) Date of Patent: *Mar. 23, 2021

(54) CONNECTING ROD FOR A VARIABLE COMPRESSION INTERNAL COMBUSTION ENGINE

(71) Applicant: ECO Holding 1 GmbH, Marktheidenfeld (DE)

(72) Inventors: David Huber, Aschaffenburg (DE); Dietmar Schulze, Muenzenberg (DE); Mario Witopil, Marktheidenfeld (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,261

(22) Filed: Mar. 21, 2019

(65) Prior Publication Data

US 2019/0301365 A1 Oct. 3, 2019

(30) Foreign Application Priority Data

Mar. 29, 2018 (DE) .......................... 102018107525.1
Jul. 16, 2018 (DE) .......................... 102018117111.0

(51) Int. Cl.
*F02B 75/32* (2006.01)
*F02B 75/04* (2006.01)
(Continued)

(52) U.S. Cl.
CPC ............ *F02B 75/045* (2013.01); *F02D 15/02* (2013.01); *F16C 7/06* (2013.01); *F16C 23/10* (2013.01); *F16C 2360/22* (2013.01)

(58) Field of Classification Search
CPC .................................. F02B 75/045; F16C 7/06
(Continued)

(56) References Cited

U.S. PATENT DOCUMENTS 9,828,909 B2 * 11/2017 Paul ........................... F16C 7/06
10,598,088 B2 * 3/2020 Mudra .................. F02B 75/045
(Continued)

FOREIGN PATENT DOCUMENTS

CN 109139246 A 1/2019
DE 102005055199 A1 5/2007
(Continued)

*Primary Examiner* — Long T Tran
*Assistant Examiner* — James J Kim
(74) *Attorney, Agent, or Firm* — Von Rohrscheldt Patents

(57) ABSTRACT

A connecting rod for a variable compression internal combustion engine, the connecting rod an eccentrical element adjustment arrangement for adjusting an effective connecting rod length, the eccentrical element adjustment arrangement including a first cylinder including a first hydraulic chamber and a second cylinder including a second hydraulic chamber, a first inlet for feeding hydraulic fluid into the first cylinder from a supply and a first outlet for draining the hydraulic fluid from the first cylinder, a second inlet for feeding hydraulic fluid into the second cylinder from the supply and a second outlet for draining the hydraulic fluid from the second cylinder, a switch valve for controlling a hydraulic fluid flow, the switch valve including a piston that is movable in a housing, wherein the piston is displaceable into a first switching position or a second switching position, wherein the second outlet of the second cylinder is connected with the supply in the first switching position and the first outlet of the first cylinder is connected with the supply in the second switching position, wherein the first cylinder is associated with a first check valve which facilitates feeding hydraulic fluid into the first cylinder and which prevents draining the hydraulic fluid from the first cylinder, wherein the second cylinder is associated with a second check valve which facilitates feeding hydraulic fluid into the second cylinder and which prevents draining hydraulic fluid from the second cylinder, wherein the first cylinder and the (Continued)

second cylinder are connected so that hydraulic fluid is conductible from the first cylinder into the second cylinder directly with a defined pressure drop in the second switching position.

15 Claims, 5 Drawing Sheets

(51) Int. Cl.
*F02D 15/02* (2006.01)
*F16C 7/06* (2006.01)
*F16C 23/10* (2006.01)

(58) Field of Classification Search
USPC .................. 123/197.3, 48 A, 48 B, 78 E
See application file for complete search history.

(56) References Cited

U.S. PATENT DOCUMENTS

| 2015/0059683 | A1* | 3/2015 | Schulze | F02B 75/32 |
| | | | | 123/197.3 |
| 2015/0075497 | A1* | 3/2015 | Hutzelmann | F02B 75/044 |
| | | | | 123/48 A |
| 2016/0319737 | A1* | 11/2016 | Schaffrath | F02B 75/045 |

FOREIGN PATENT DOCUMENTS

| DE | 102012020999 A1 | 1/2014 |
| DE | 102016208329 A1 | 11/2017 |
| DE | 102016217983 A1 | 3/2018 |
| EP | 3211256 A2 | 8/2017 |
| WO | WO2017194050 A2 | 11/2017 |
| WO | WO2018006904 A1 | 1/2018 |

* cited by examiner

CONNECTING ROD FOR A VARIABLE COMPRESSION INTERNAL COMBUSTION ENGINE

RELATED APPLICATIONS

This application claims priority from and incorporates by reference German patent applications DE 10 2018 107 525.1 filed on Mar. 29, 2018; and DE 10 2018 117 111.0 filed on Jul. 16, 2018.

FIELD OF THE INVENTION

The invention relates to a connecting rod for a variable compression internal combustion engine with an eccentrical element adjustment arrangement for adjusting an effective connecting rod length.

BACKGROUND OF THE INVENTION

In internal combustion engines a high compression ratio has a positive effect upon an efficiency of the internal combustion engine. Compression ratio is typically defined as a ratio of an entire cylinder cavity before compression to a remaining cylinder cavity after compression. In internal combustion engines with external ignition, in particular gasoline engines that have a fixed compression ratio, the compression ratio, however, may only be selected high enough so that a so-called "knocking" of the internal combustion engine is prevented during full load operations. However, for much more prevalent partial load operations of the internal combustion engine, thus for a lower cylinder charge the compression ratio can be selected at a higher level without "knocking" occurring. The important partial load operations of an internal combustion engine can be improved when the compression ratio is variably adjustable. In order to adjust the compression ratio systems with variable connecting rod length are known. A system with variable connecting rod length is known e.g. from De 10 2005 055 199 A1.

BRIEF SUMMARY OF THE INVENTION

Thus it is an object of the invention to provide an improved connecting rod for a variable compression internal combustion engine with an eccentrical element adjustment arrangement for adjusting an effective connecting rod length which has improved operating properties.

The object is achieved by the features of the independent claim.

Advantageous embodiments and advantages of the invention can be derived from the dependent claims, the description and the drawing figure.

A connecting rod for a variable compression internal combustion engine is proposed, the connecting rod comprising an eccentrical element adjustment arrangement for adjusting an effective connecting rod length, wherein the eccentrical element adjustment arrangement includes at least a first cylinder and a second cylinder with hydraulic chambers, and wherein an inlet is provided respectively for feeding hydraulic fluid into the cylinder from a supply as well as an outlet for draining the hydraulic fluid from the cylinders. A switch valve for controlling a hydraulic fluid flow includes a piston that is movable in a housing, wherein the piston is displaceable into a first switching position or a second switching position. In the first switching position, the drain of the second cylinder is connected with the supply, and in the second switching position the drain of the first cylinder is connected with the supply. The cylinders are respectively associated with a check valve which facilitates feeding hydraulic fluid into the cylinders and which prevents a draining of the hydraulic fluid from the cylinders.

According to the invention, the cylinders are connected so that hydraulic fluid is conductible from the first cylinder into the second cylinder directly with a defined pressure drop in the second switching position. Defined means therefore that the pressure drop is predetermined by engineering design. The defined pressure drop reduces the hydraulic pressure in the MKS hydraulic chamber and thus the maximum MKS forces.

The invention facilitates a hydraulic arrangement when operating the connecting rod with an eccentrical element adjustment arrangement for adjusting an effective connecting rod length which provides that the system is hydraulically preloaded in a switching position for the low compression ($\varepsilon_{low}$) of the internal combustion engine. This means that hydraulic fluid, e.g., motor oil, from a larger hydraulic chamber on a gas force side (GKS hydraulic chamber) of the adjustable connecting rod is conducted directly into a smaller hydraulic chamber on a mass force side (MKS hydraulic chamber). Thus, superfluous oil can be drained through a throttling location into the bearing shell.

Simultaneously it can be provided for the switching process from the low compression ($\varepsilon_{low}$) to the high compression ($\varepsilon_{high}$) that the system is always supplied with a sufficient amount of oil, so that the oil pressure does not drop too far. A pressure drop can directly cause air to gas out of the oil which causes the system to lose the hydraulic preload. This could cause a destabilization of the eccentrical lever system. The switch valve according to the invention prevents that the eccentrical element lever travels through a large amplitude during a revolution of the crankshaft, which would cause almost unattenuated impacts of the support pistons on the chamber base or the oil column and eventually cause very high pressure spikes in the system.

In the high compression position ($\varepsilon_{high}$) the drain of the MKS hydraulic chamber is connected with the supply conduit. Draining oil from the MKS hydraulic chamber can be directly received through the check valve from the GKS hydraulic chamber. When the MKS hydraulic chamber volume is smaller than GKS hydraulic chamber volume, the differential oil volume is fed through the supply side check valve. The drain from the MKS hydraulic chamber is performed in a throttled manner in order to limit the adjustment velocity from the low compression position ($\varepsilon_{low}$) into the high compression position ($\varepsilon_{high}$).

In the high compression position ($\varepsilon_{high}$) the drain of the GKS hydraulic chamber is closed. Leakage oil that can leak at the piston can drain through boreholes in the typically provided closing covers of the switch valve in a direction towards the tank.

In the low compression position ($\varepsilon_{low}$) the oil from the GKS hydraulic chamber is conducted directly in front of the check valve of the MKS hydraulic chamber through the boreholes in the connecting rod.

During the switching process from the high compression ($\varepsilon_{high}$) to the low compression ($\varepsilon_{low}$) higher dynamic forces occur as a matter of principle than the forces that were considered for the static engineering design case. Through the direct short circuit of the GKS chamber and the MKS chamber the same pressure has to be provided in the GKS chamber and in the MKS chamber. This pressure augmentation in the MKS chamber leads to a reinforcement of the eccentrical element torque which in turn generates higher forces that impact the GKS side. This short circuit increases the pressure level in the GKS chamber.

The switch valve can be configured mechanically actuated or hydraulically actuated and can be arranged at any location in the connecting rod.

Advantageously the drain of the GKS chamber can be closed by the switch valve in the high compression position $\varepsilon_{high}$ of the connecting rod. Through the check valve that is associated with the GKS chamber hydraulic fluid can flow. Thus, the check valve is arranged so that a hydraulic fluid flow is only possible in the filling direction. Thus, hydraulic fluid can be fed to the GKS chamber. The drain of the MKS chamber is opened by the switch valve. The hydraulic fluid flow is limited by the throttling location. A hydraulic fluid flow is possible in both flow directions. Through the check valve associated with the MKS chamber a hydraulic fluid flow can only occur in the filling direction. The hydraulic fluid flow is limited by the throttling location in the inlet to the GKS chamber, thus hydraulic fluid can be drained from the MKS chamber and the MKS chamber can be emptied.

Advantageously the drain of the GKS chamber can be opened by the switch valve in the low compression position ($\varepsilon_{low}$) of the connecting rod. The hydraulic fluid flow can flow in a direction of the check valve that is associated with the MKS chamber. The superfluous hydraulic fluid flow in a direction of a bearing shell of the connecting rod can be limited by the suitably arranged throttling location. Hydraulic fluid can low through the check valve that is associated with the GKS chamber. Thus, the check valve is arranged so that a hydraulic fluid flow is only possible in the filling direction. Thus, the GKS chamber can empty. The drain of the MKS chamber is closed by the check valve. Hydraulic fluid can flow through the check valve that is associated with the MKS chamber. Thus, the check valve is arranged so that a hydraulic fluid flow is only possible in the filling direction. This way the MKS chamber can fill.

Through the hydraulic arrangement with a switch valve for controlling a hydraulic fluid flow of a connecting rod for a variable compression internal combustion engine with an eccentrical element adjustment arrangement for adjusting an effective connecting rod length stable switching properties of the connecting rod can be achieved.

Advantageously at least the check valve that is associated with the MKS chamber can be integrated in the capture element of the switch valve. One or plural throttling locations can be integrated in the hydraulic conduits in the capture element, e.g. by constrictions in the hydraulic conduits. This way the required installation space of the hydraulic arrangement can be configured as compact as possible.

Optionally hydraulic fluid can be conductible in the second switching position from the second cylinder into the first cylinder. Advantageously the hydraulic fluid, e.g. motor oil from the MKS chamber can be used for filling the GKS chamber, so that the required hydraulic fluid does not have to be fed entirely from the hydraulic supply, e.g. the bearing shell of the connecting rod.

The drain of the second cylinder can include at least one throttling location. This way the hydraulic fluid flow in the direction towards the GKS chamber can be limited in the position for high compression $\varepsilon_{high}$ which yields stable switching properties of the connecting rod. By the same token a throttling location can be arranged between the supply conduit and the inlet of the second cylinder. Through this throttling location a portion of the hydraulic fluid that is branched off in a direction towards the hydraulic supply can be limited in the low compression position $\varepsilon_{low}$ so that a greater portion of the hydraulic fluid that drains from the GKS chamber can be advantageously used for filling the MKS chamber.

The switch valve, the throttling locations and/or at least one of the check valves can be integrated in a discrete hydraulic module. At least the check vale that is associated with the MKS chamber, the switch valve and/or the throttling locations can be integrated in a separate hydraulic module which can be mounted in a connecting rod as a module. Thus machining the connecting rod can be advantageously simplified.

Advantageously at least one of the throttling locations can be integrated into the switch valve. Advantageously throttling locations can be integrated in the hydraulic conduits in the capture element of the switch valve or also in the valve body for example by constrictions in the hydraulic conduits. This way the required installation space of the hydraulic arrangement can be compacted and minimized.

Advantageously at least one of the check valves and/or at least one of the throttling locations can be integrated into the switch valve. Advantageously at least the check valve that is associated with the MKS chamber can be integrated in the capture element or in the valve body of the switch valve. Also throttling locations can be integrated in the hydraulic conduits in the capture element or in the valve body e.g. by constrictions in the hydraulic conduits. This way the required installation space of the hydraulic arrangement can be configured as compact as possible.

According to an advantageous embodiment a chamber volume of the second hydraulic chamber can be configured smaller than a chamber volume of the first hydraulic chamber and the second hydraulic chamber can be hydraulically preloadable. For example the GKS hydraulic chamber can have a larger volume than the MKS hydraulic chamber. Thus more hydraulic fluid, e.g. oil is provided upstream of the hydraulic valve of the MKS hydraulic chamber than can be received by the MKS hydraulic chamber. The differential volume of oil can be drained in a direction towards the supply by a throttling element which prevents unthrottled draining of the oil from the GKS hydraulic chamber. Thus, the adjustment speed of the connecting rod towards the low compression position (Flow) can be limited.

The volumes of the two hydraulic chambers can also be selected identical.

According to an advantageous embodiment hydraulic fluid can be conductible in the second switching position from the first cylinder through devices providing a defined pressure drop into the second cylinder, wherein the devices can be arranged in the hydraulic connection between the first cylinder and the second cylinder. Advantageously a pressure increase in the second cylinder can be reduced and more stable properties of the connecting rod can be achieved during switching.

According to an advantageous embodiment of the invention the devices providing the defined pressure drop can be formed by the check valve of the second cylinder. The check valve itself generates the pressure drop in the hydraulic fluid flow. The pressure drop can be defined e.g. by a stroke limitation.

Advantageously the devices providing the defined pressure drop are configured as an aperture. The defined throttling of the hydraulic fluid flow through the aperture is thus configured so that it comes very close to a so called ideal aperture. In an element of this type the flow resistance is ideally independent from the viscosity of the hydraulic fluid that flows through. Advantageously these properties can be imitated by an aperture or at least approximated wherein a flow channel of the aperture for the hydraulic fluid is as short as possible.

Advantageously the aperture can be arranged in front of the check valve of the second cylinder. In particular the aperture can be arranged between the check valve of the second cylinder and a branch off point where an inlet of the second cylinder is connected with an outlet of the first cylinder. The aperture can be provided separately.

According to an advantageous embodiment the aperture can be arranged in the drain of the first cylinder upstream of a branch off point, where an inlet of the second cylinder is connected with a drain of the first cylinder. This facilitates positioning the aperture as required.

Optionally an aperture can be provided in front of the branch off point as well as behind the branch off point.

According to an advantageous embodiment the aperture is integrated into the check valve. The aperture can thus be provided in a simple manner as a tapered suction bore hole in the check valve. An additional component does not have to be provided. Thus, it is also conceivable to integrate the aperture as an aperture insert into the check valve. The integration into the check valve facilitates a compact configuration of the check valve with an additional function of controlled throttling of the flow through of the hydraulic fluid.

According to another advantageous embodiment the aperture can be arranged as a tapered bore hole in the connecting rod. Depending on the configuration of the connecting rod and the routing of the hydraulic fluid conduits the aperture can thus be provided in the connecting rod in a simple manner.

According to an advantageous embodiment the aperture can be arranged as an aperture insert in the connecting rod. Complex machining of the connecting rod can thus avoided.

According to an advantageous embodiment the aperture can be configured so that its flow resistance is essentially independent from a viscosity of the hydraulic fluid flowing through. This facilitates a high level of precision and controlability when throttling the flow through of the hydraulic fluid.

According to an advantageous embodiment a throttling location can be integrated into the drain of the second cylinder. This way the adjustment speed of the connecting rod in a direction towards high compression can be limited.

According to an advantageous embodiment the switch valve can be configured as a 4/2 way valve. Inlet channels of the switch valve are the two drain channels of the GKS hydraulic chamber and the MKS hydraulic chamber which can be switched alternatively to the supply and the inlet of the MKS hydraulic chamber in the two switching positions.

BRIEF DESCRIPTIONS OF THE DRAWINGS

Further advantages can be derived from the subsequent drawing description. The drawings schematically illustrate an embodiment of the invention. The drawings, the description and the claims include several features in combination. A person skilled in the art will advantageously view the features also individually and group them into useful additional combinations, wherein:

DETAILED DESCRIPTION OF THE INVENTION

Figure 1:
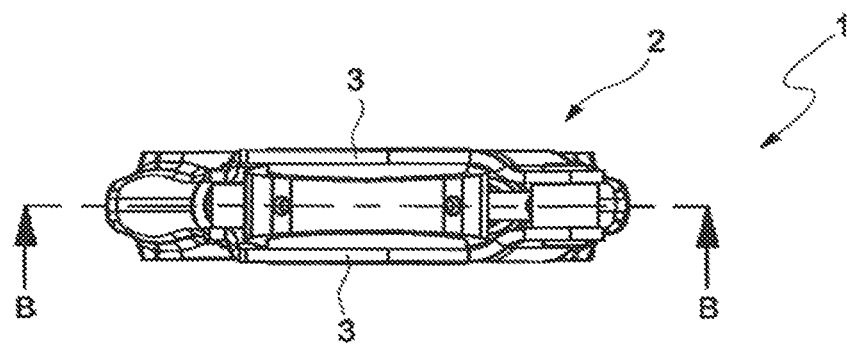
FIG. 1 illustrates a top view of the connecting rod according to the invention with an indicated sectional plane B-B.

In the drawing figures identical or like components are designated with identical reference numerals. The drawing figures merely illustrate exemplary embodiments and do not limit the spirit and scope of the invention.

The connecting rod 1 for a variable compression internal combustion engine is illustrated in an exemplary manner in FIGS. 1 (top view) and 2 (longitudinal sectional view) in the sectional plane B-B. The connecting rod includes an eccentrical element adjustment arrangement 2 for adjusting an effective connecting rod length which is defined as a distance of a center axis of a crank bearing eye 12 from a center axis of the bore hole of an eccentrical element 4 that is arranged in a crank bearing eye 13. The eccentrical element adjustment arrangement 2 includes the eccentrical element 4 that cooperates with the one piece or multi piece eccentrical element in which a non-illustrated wrist pin of a cylinder piston is received. An adjustment travel of the eccentrical element adjustment arrangement 2 is hydraulically adjustable by a switch valve 5.

The switch valve 5 facilitates controlling a hydraulic fluid flow of the connecting rod 1 through the eccentrical element adjustment arrangement 2 for adjusting an effective connecting rod length. Thus, the eccentrical element adjustment arrangement includes at least a first cylinder and a second cylinder with hydraulic chambers 14, 15. A respective inlet 16, 17 for feeding hydraulic fluid into the cylinders from a supply source P as well as a drain 20, 21 for draining hydraulic fluid from the cylinders are provided. The switch valve 5 includes a piston that is movable in a housing and displaceable into a first switching position S1 or a second switching position S2 which are respectively illustrated as hydraulic diagrams of the connecting rod 1 in FIGS. 3 and 4 or in another embodiment in FIGS. 5 and 6.

In the first switching position S1 the drain 21 of the second cylinder is connected through the switch valve 5 with the supply source P, and in the second switching position S2 the drain 20 of the first cylinder is connected through the switch valve 5 with the supply P. The cylinders are respectively associated with a check valve 18, 19 which facilitates feeding hydraulic fluid into the cylinders and prevents a draining of the hydraulic fluid from the cylinders. The cylinders are connected so that hydraulic fluid is conductible from the first cylinder into the second cylinder directly and with a defined pressure drop in the second switching position. A defined pressure drop means according to the invention that the pressure drop is predetermined by engineering design. Also a flow-through of the switch valve 5 can cause a throttling, this throttling, however, is not considered to be defined. The defined pressure drop is achieved according to the invention by devices which are provided in the connection between the first and second cylinders. These devices for the defined pressure drop can be formed, e.g., by the check valve 19 of the second cylinder itself, or they can be provided as an aperture 30.

Advantageously, the pressure drop, and the ensuing defined throttling are caused by the aperture 30 which is advantageously configured so that it is very close to a so-called ideal aperture. In an element of this type, the flow resistance is ideally independent from the viscosity of the hydraulic fluid flowing through. Advantageously, these properties can be imitated by an aperture 30 or at least approximated wherein a flow channel for the hydraulic fluid in the aperture is as short as possible.

A chamber volume of the second hydraulic chamber 15 is smaller than a chamber volume of the first hydraulic chamber 14 so that the second hydraulic chamber 15 is hydraulically preloadable.

Figure 3:
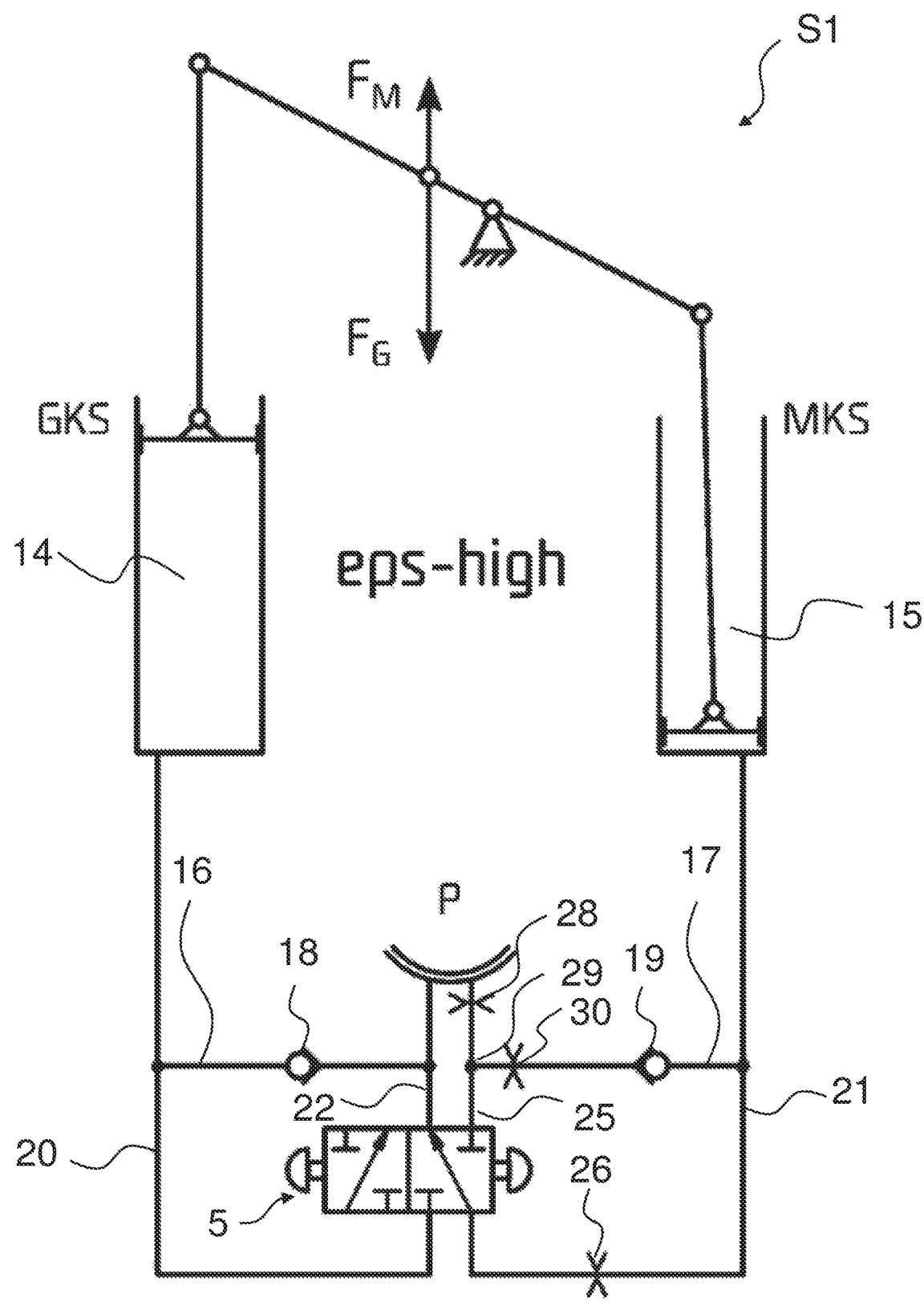
FIG. 3 illustrates a hydraulic diagram of a first embodiment of the connecting rod according to the invention according to FIGS. 1 and 2 in the first switching position.
Figure 4:
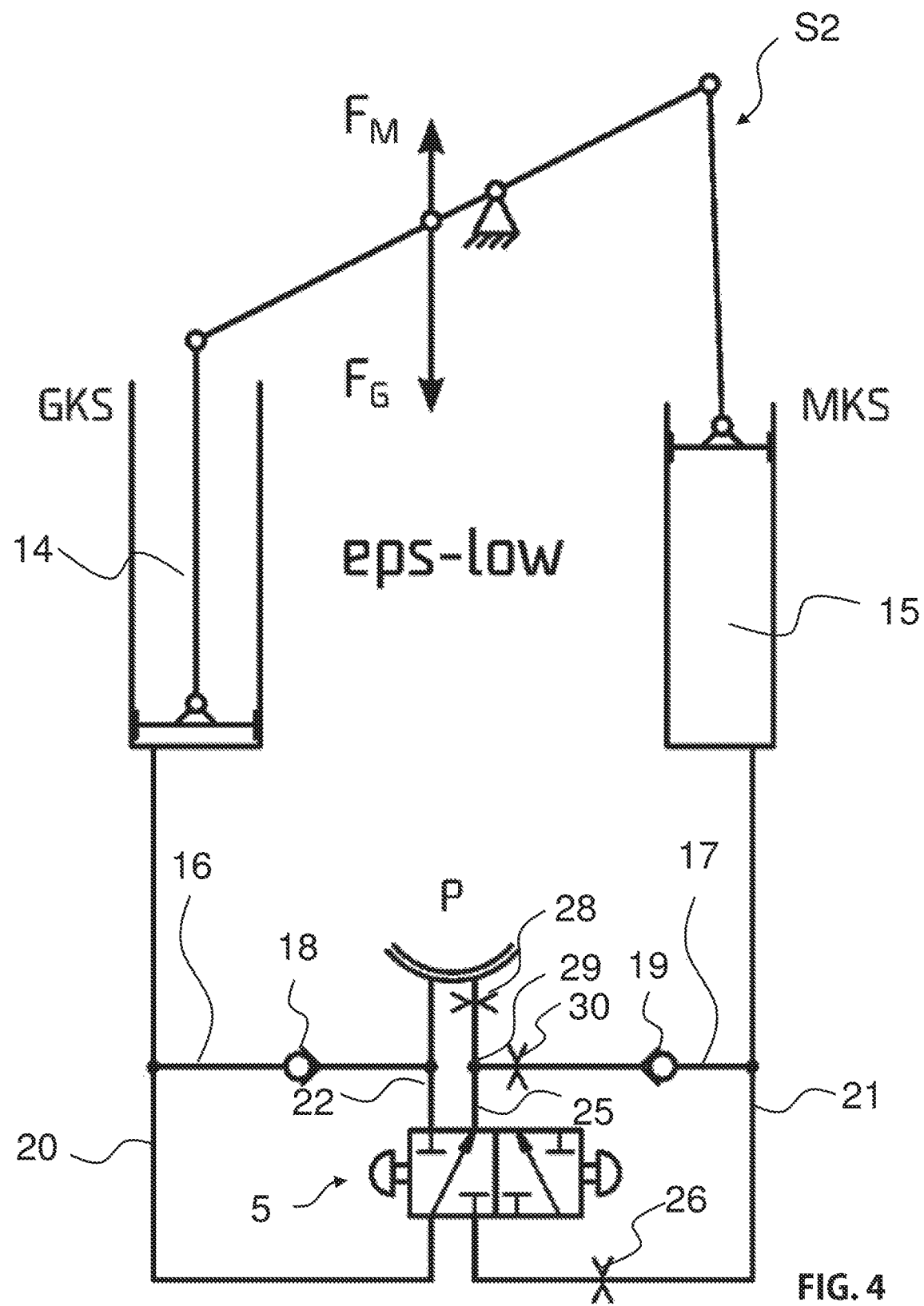
FIG. 4 illustrates the hydraulic diagram according to the first embodiment of the connecting rod according to the invention according to FIGS. 1 and 2 in the second switching position.
Figure 5:
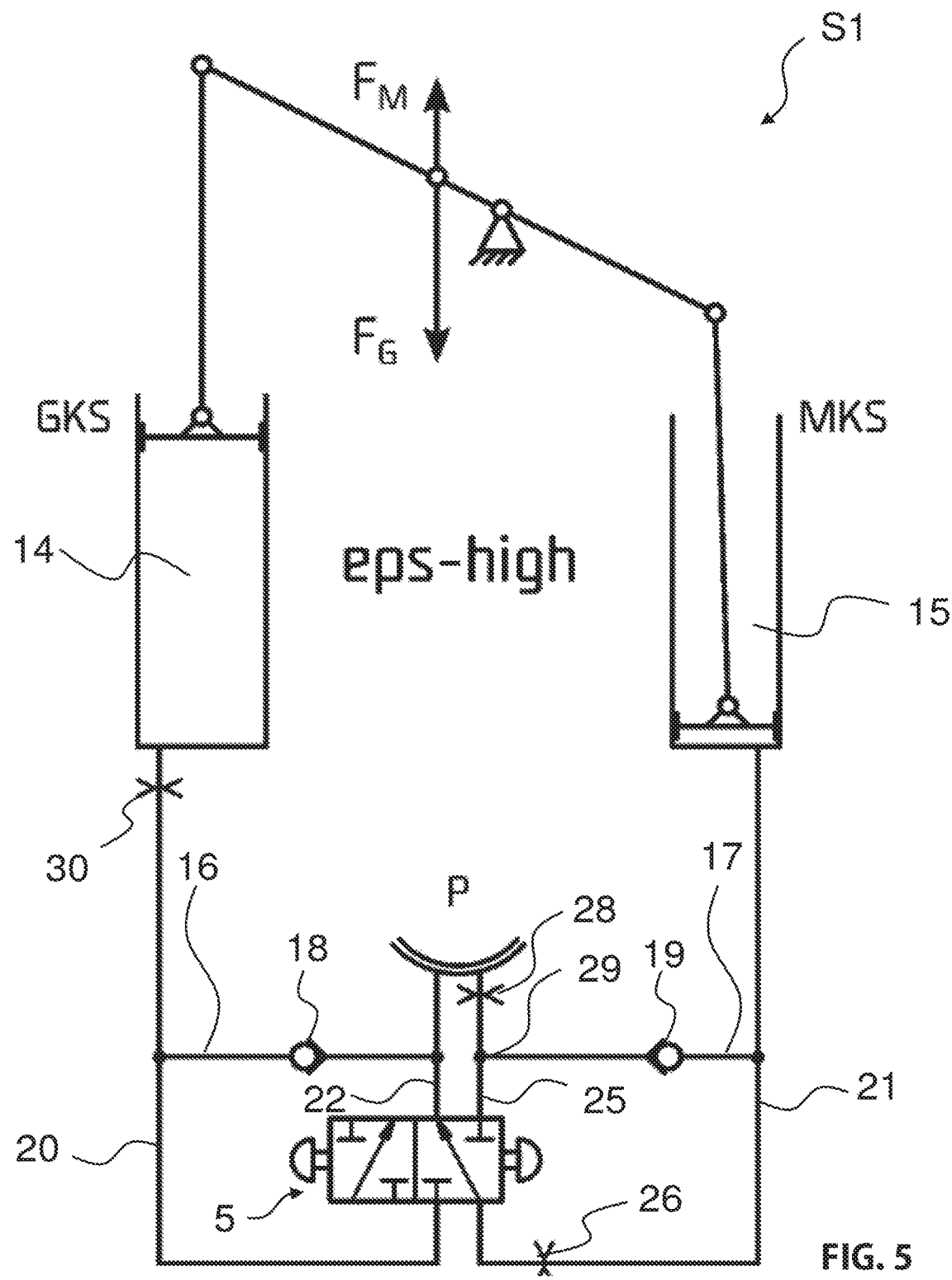
FIG. 5 illustrates a hydraulic diagram of another embodiment of the connecting rod according to FIGS. 1 and 2 in the first switching position.
Figure 6:
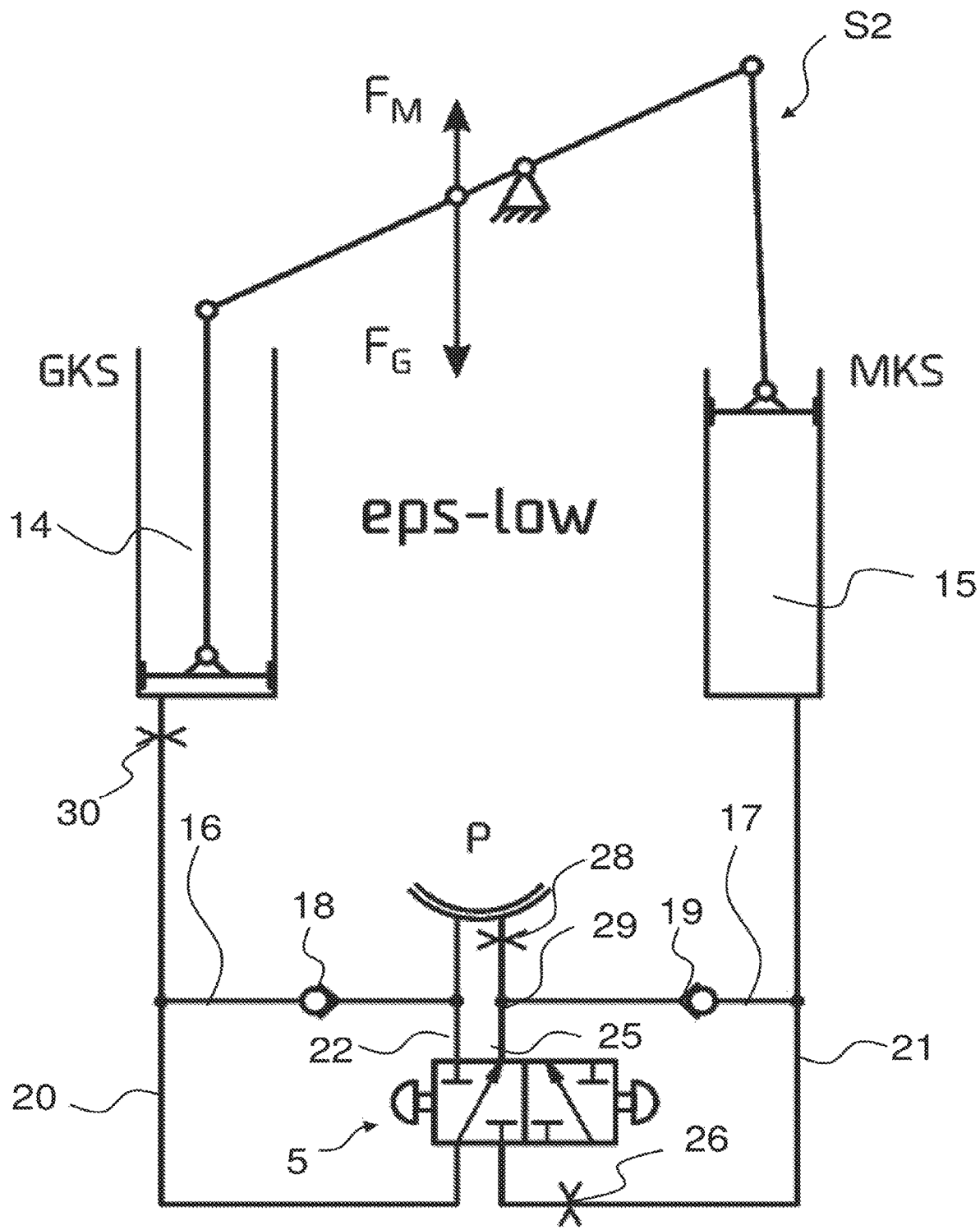
FIG. 6 illustrates the hydraulic diagram of the additional embodiment of the connecting rod according to the invention according to FIGS. 1 and 2 in the second switching position.

A rotation of the adjustable eccentrical element adjustment arrangement 2 is initiated by an impact of mass forces designated FM in the two embodiments of FIGS. 3 through 6 and gas load forces designated FG in the two embodiments of FIGS. 3 and 6 of the internal combustion engine wherein the forces impact the eccentrical element adjustment arrangement 2 during an operating stroke of the internal combustion engine. During an operating stroke, the effective directions of forces that impact the eccentrical element adjustment arrangement 2 change continuously. The rotating movement or adjustment movement is supported by one or plural pistons 6, 7 that are loaded with the hydraulic fluid, in particular with motor oil, and integrated in the piston 1, or the pistons 6, 7 prevent a reset of the eccentrical element adjustment arrangement 2 due to varying force impact directions of forces that impact the eccentrical element adjustment arrangement 2.

The pistons 6, 7 are respectively movably supported in cylinder boreholes 8, 9 of hydraulic cylinders of the connecting rod 1 and connected with support rods 10, 11, which in turn are pivotably linked with the eccentrical element lever 3.

The connecting rod 1 includes the crank bearing eye 12 for connecting the connecting rod 1 at a crank shaft of an internal combustion engine and a connecting rod bearing eye 13 for connecting the connecting rod 1 with the cylinder piston of the internal combustion engine.

The pistons 6, 7 are movably supported in the hydraulic chambers 14, 15 formed by the cylinder boreholes 8, 9 and loaded through inlets 16, 17 from the crank bearing eye 12 with hydraulic fluid, e.g., motor oil, through check valves 18, 19. The check valves prevent a flow-back of the hydraulic fluid from the hydraulic chambers 14, 15 into the inlets 16, 17 but facilitate a pulling of the hydraulic fluid into the hydraulic chambers 14, 15.

The hydraulic chambers 14, 15 are connected through drains 20, 21 illustrated in the hydraulic diagrams of the connecting rod 1 in FIGS. 3 and 4 or FIGS. 5 and 6 with the switch valve 5 which is configured, e.g., as a mechanical switch or as a hydraulic valve and connected through a drain conduit 22 with the crank bearing eye 12 or a bearing shell.

Figure 2:
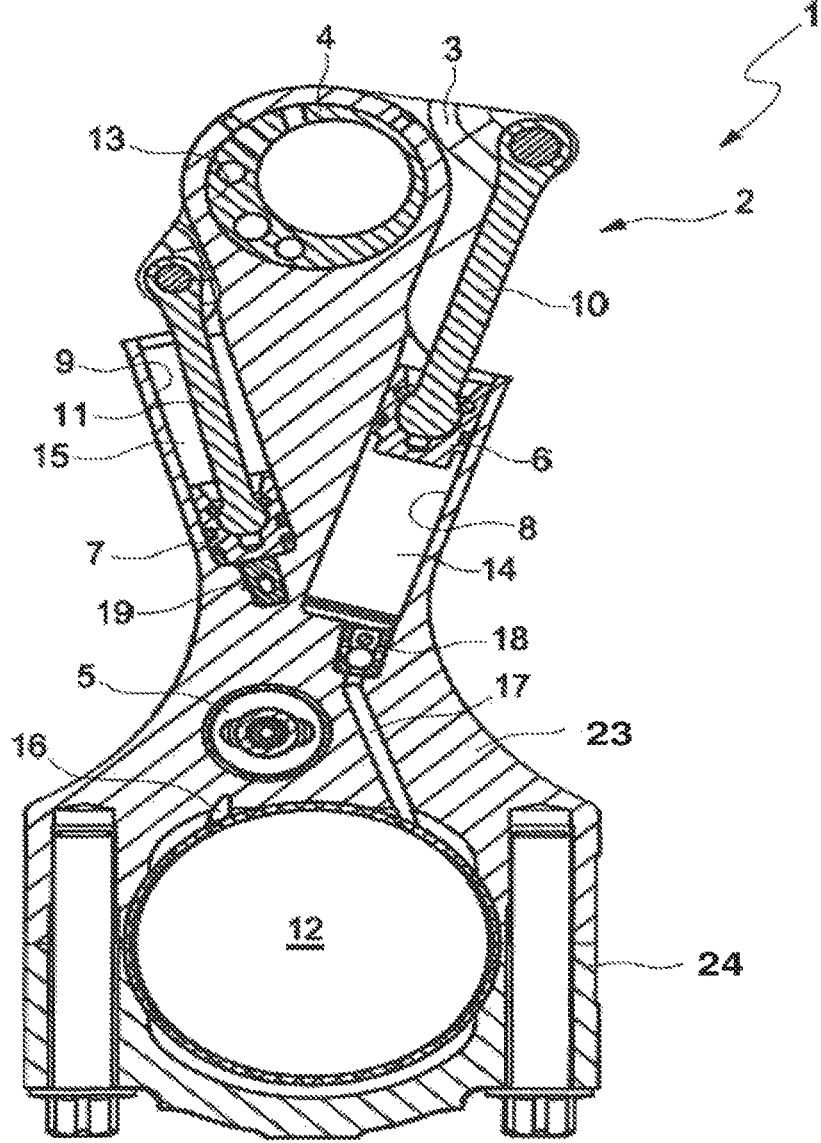
FIG. 2 illustrates a longitudinal sectional view along the sectional plane B-B through the connecting rod according to FIG. 1.

As evident, e.g., from FIG. 2, the connecting rod 1 includes a connecting rod body 23 and a connecting rod cover 24 attached to the connecting rod body.

The cylinder borehole 8 forms the hydraulic chamber 14 on the gas force side (GKS) of the connecting rod 1, whereas the cylinder borehole 9 represents the hydraulic chamber 15 on the mass force side (MKS) of the connecting rod 1.

As evident from FIGS. 3 and 4 and FIGS. 5 and 6, the switch valve 5 is configured as a 4/2 way valve. Inlet channels of the switch valve 5 are the two drain channels 20, 21 of the GKS hydraulic chamber 14 or of the MKS hydraulic chamber 15 which can be switched in the switching positions S2 alternatively to the supply P or an inlet 25 of the MKS hydraulic chamber 15.

A throttle location 26 is thus arranged in the drain 21 of the second cylinder. This way the adjustment speed of the connecting rod can be limited in a direction towards high compression ($\varepsilon_{high}$) indicated in the diagram as eps_high.

The drain 21 is connected with the drain conduit 22 so that draining oil from the MKS hydraulic chamber 15 can be received again through the check valve 18 by the GKS hydraulic chamber 14.

In FIG. 3 as well as in the configuration of the switching position of the switch valve 5 illustrated in FIG. 5 the connecting rod 1 is in the switching position S1 for high-compression ($\varepsilon_{high}$). In this operating condition the GKS hydraulic chamber 14 is filled with hydraulic fluid/oil, and the MKS hydraulic chamber 15 is connected in a throttled manner through the drain 21 and the switch valve 5 with a supply P or the bearing shell of the connecting rod 1.

In the switching position of the switch valve 5 that is illustrated in FIG. 4 as well as in the configuration of FIG. 6, the connecting rod 1 is in the switching position S2 for low compression ($\varepsilon_{low}$) designated in the drawing figure as eps_low. In this operating condition, the GKS hydraulic chamber 14 is connected through the drain 20 and the switch valve 5 and the inlet 25 with the MKS hydraulic chamber 15, and therefore the MKS hydraulic chamber 15 is filled with hydraulic fluid/oil.

In the second switching position S2 an overflow conduit 27 is connected with the supply P.

Since the GKS hydraulic chamber 14 includes a greater chamber volume than the MKS hydraulic chamber 15, the superfluous volume flow is conducted towards the supply P, e.g., the bearing shell of the connecting rod 1 through a throttle 28. The pressure thus created is much higher than the supply pressure when the throttle 28 is correctly sized and is also provided upstream of the check valve 19 of the MKS hydraulic chamber 15 which assures a safe filling of the MKS hydraulic chamber 15. This way the hydraulic preload is assured.

Simultaneously, the throttle 28 causes a limitation of the speed at which the GKS piston 6 impacts the chamber base of the GKS hydraulic chamber 14. As evident from FIGS. 3 and 4 and FIGS. 5 and 6, the throttle 28 is arranged between a branch off point 29 and the supply P, wherein the inlet of the second cylinder 17 is connected with the drain 20 or the downstream inlet 25 of the second cylinder 17 at the branch off point 29.

During the switching process from the high compression ($\varepsilon_{high}$) to the low compression ($\varepsilon_{low}$) higher dynamic support rod forces occur as a matter of principle than in the static design case. Through the direct short circuit of the GKS hydraulic chamber and the MKS hydraulic chamber, the same pressure has to be provided in GKS and MKS. This pressure increase in the MKS hydraulic chamber 15 leads to an increase of the eccentrical element torque through the support rod 11 which in turn generates higher forces that impact the GKS support rod 10. This short circuit increases the pressure level in the GKS hydraulic chamber 14 as a function of geometric conditions by a factor of 2.2 compared to the design case (maximum gas force, low end torque with an ideally sealed hydraulic chamber).

By throttling the hydraulic fluid that is conducted towards the second cylinder in the second switching position S2, a defined pressure drop is caused according to the invention so that the hydraulic pressure in the MKS hydraulic chamber, and thus the maximum MKS forces can be reduced. Through the throttling, it is possible to reduce the maximum occurring MKS support rod forces during the switching process for MKS preloaded hydraulic arrangements so that they do not exceed the static design case anymore (idle load, maximum rpm, max. mass forces in tension direction).

The defined pressure drop or the throttling of the hydraulic fluid flowing from the first cylinder into the second cylinder is performed through an aperture 30, wherein the aperture 30 is arranged upstream of the check valve 19 of the second cylinder. Advantageously, the aperture 30 has a minimum length flow path so that the flow-through of the hydraulic fluid is throttled independently from viscosity.

As a matter of principle the defined pressure drop can be achieved according to the invention by other engineering design devices or measures like e.g. a stroke limitation of the check valve 19 of the second cylinder.

As can be derived from the embodiment in FIGS. 3 and 4 the aperture 30 is arranged in particular between the check valve 19 of the second cylinder and the branch off 29 where the inlet 17 of the second cylinder is connected with the outlet 20 of the first cylinder or the downstream inlet 25. The aperture 30 does not have to be arranged at the position recited supra. As a matter of principle the aperture can be arranged in the entire hydraulic connection path between the drain of the first hydraulic cylinder 14 and the inlet of the second hydraulic cylinder 15. Thus, the aperture 30 can be arranged e.g. in the drain 20. An integration into the check valve is also feasible within the spirit and scope of the invention.

According to an embodiment the aperture 30 can be integrated into the check valve 19. The aperture 30 could thus be simply provided as a tapered inlet bore hole in the check valve 19 so that no additional component is required.

Alternatively, however, the aperture 30 can be integrated as an aperture insert into the check valve 19 wherein the aperture insert is e.g. threaded, pressed or glued into the check valve 19 so that a preassembled module is created. Other attachment methods are also feasible.

According to another embodiment the aperture 30 can be arranged as a tapered bore hole in the connecting rod body 23 or in the connecting rod cover 24. Depending on a configuration of the connecting rod and a routing of the hydraulic fluid conduits the aperture 30 can thus be provided in a simple manner in the connecting rod 1.

According to another alternative embodiment the aperture 30 can be provided as an aperture insert in the connecting rod body 23 or in the connecting rod cover 24, wherein the aperture insert can be threaded, pressed or glued into the connecting rod body 23 or the connecting rod cover 24. Other attachment options are feasible.

FIGS. 5 and 6 illustrate another embodiment of the connecting rod 1 according to the invention. The function is similar to the embodiment in FIGS. 3 and 4.

As can be derived from FIGS. 5 and 6 the aperture 30 is arranged between the first cylinder and the branch off point 29 where the inlet 17 of the second cylinder is connected with the outlet 20 of the first cylinder or the subsequent inlet 25. The arrangement of the aperture 30 does not have to be performed at the position recited supra. As a matter of principle the aperture 30 can be arranged in the entire hydraulic connection path between the drain of the first hydraulic cylinder 14 and the inlet of the second hydraulic cylinder 15. Thus, the aperture 30 can also be arranged the drain 20. An integration into the switch valve 5 is also conceivable within the spirit and scope of the invention.

According to one embodiment the aperture 30 can be arranged as a tapered bore hole in the connecting rod body 23 or in the connecting rod cover 24. Depending on the configuration of the connecting rod 1 and the routing of the hydraulic fluid conduits the aperture 30 can thus be provided in a simple manner in the connecting rod 1.

According to another alternative embodiment the aperture 30 can be arranged as an aperture insert in the connecting rod body 23 or in the connecting rod cover 24, wherein the aperture insert can be threaded, pressed or glued into the connecting rod body 23 or the connecting rod cover 24. Thus, both attachment options are conceivable.

What is claimed is:

1. A connecting rod for a variable compression internal combustion engine, the connecting rod comprising:
   an eccentrical element adjustment arrangement for adjusting an effective connecting rod length, the eccentrical element adjustment arrangement including
   a first cylinder including a first hydraulic chamber and a second cylinder including a second hydraulic chamber,
   a first inlet for feeding hydraulic fluid into the first cylinder from a supply and a first outlet for draining the hydraulic fluid from the first cylinder,
   a second inlet for feeding hydraulic fluid into the second cylinder from the supply and a second outlet for draining the hydraulic fluid from the second cylinder,
   a switch valve for controlling a hydraulic fluid flow, the switch valve including a piston that is movable in a housing, wherein the piston is displaceable into a first switching position or a second switching position,
   wherein the second outlet of the second cylinder is connected with the supply in the first switching position and the first outlet of the first cylinder is connected with the supply in the second switching position,
   wherein the first cylinder is associated with a first check valve which facilitates feeding hydraulic fluid into the first cylinder and which prevents draining the hydraulic fluid from the first cylinder,
   wherein the second cylinder is associated with a second check valve which facilitates feeding hydraulic fluid into the second cylinder and which prevents draining hydraulic fluid from the second cylinder,
   wherein the first cylinder and the second cylinder are connected so that hydraulic fluid is conductible from the first cylinder into the second cylinder directly with a defined pressure drop in the second switching position.

2. The connecting rod according to claim 1, wherein a chamber volume of the second hydraulic chamber is smaller than a chamber volume of the first hydraulic chamber and the second hydraulic chamber is hydraulically preloadable.

3. The connecting rod according to claim 1,
   wherein hydraulic fluid is conductible in the second switching position from the first cylinder through devices that generate the defined pressure drop into the second cylinder, and
   wherein the devices are arranged in a hydraulic connection between the first cylinder and the second cylinder.

4. The connecting rod according to claim 3, wherein the devices that generate the defined pressure drop are formed by the second check valve of the second cylinder.

5. The connecting rod according to claim 4, wherein the second check valve generates the defined pressure drop through a limited stroke.

6. The connecting rod according to claim 3, wherein the devices that generate the defined pressure drop are configured as an aperture.

7. The connecting rod according to claim 6, wherein the aperture is arranged upstream of the second check valve of the second cylinder.

8. The connecting rod according to claim 7, wherein the aperture is arranged between the second check valve of the second cylinder and a branch off point at which the second inlet of the second cylinder is connected with the first outlet of the first cylinder.

9. The connecting rod according to claim 6, wherein the aperture is arranged in the first outlet of the first cylinder upstream of a branch off point at which the second inlet of the second cylinder is connected with the first outlet of the first cylinder.

10. The connecting rod according to claim 6, wherein the aperture is integrated into the check valve.

11. The connecting rod according to claim 6, wherein the aperture is a tapered bore hole in the connecting rod.

12. The connecting rod according to claim 6, wherein the aperture is arranged as an aperture insert in the connecting rod.

13. The connecting rod according to claim 6, wherein the aperture is configured so that its flow resistance is essentially independent from a viscosity of a hydraulic fluid flowing through.

14. The connecting rod according to claim 1, wherein a throttling location is arranged in the second outlet of the second cylinder.

15. The connecting rod according to claim 1, wherein the switch valve is configured as a hydraulically actuatable 4/2 way valve.

* * * * *